Aug. 30, 1938.   L. S. WALLIS   2,128,566
SPRING ASSEMBLY FOR MATTRESSES AND UPHOLSTERY
Filed Feb. 25, 1936   2 Sheets-Sheet 1

INVENTOR,
Lionel Selby Wallis,
By
Andrew Wilson
Attorney.

Aug. 30, 1938.  L. S. WALLIS  2,128,566
SPRING ASSEMBLY FOR MATTRESSES AND UPHOLSTERY
Filed Feb. 25, 1936   2 Sheets-Sheet 2

INVENTOR,
Lionel Selby Wallis
By
Andrew Wilson
Attorney.

Patented Aug. 30, 1938

2,128,566

UNITED STATES PATENT OFFICE 2,128,566

SPRING ASSEMBLY FOR MATTRESSES AND UPHOLSTERY

Lionel Selby Wallis, Tyseley, Birmingham, England

Application February 25, 1936, Serial No. 65,559
In Great Britain December 24, 1935

6 Claims. (Cl. 5—270)

This invention relates to improvements in spring assemblies for mattresses and upholstery of the type formed by parallel rows of upholstery springs the end coils of which are interconnected.

The object of my invention is to provide an improved method of and means for securely interconnecting adjacent springs in a spring assembly whereby free flexing of the individual springs is permitted, the connecting means being simple both to manufacture and to apply to the springs.

According to my invention the end coils of adjacent springs in a spring assembly are connected together by fitting a depending curled loop or coil on a connecting wire over the adjacent parts of the spring coils and locking the connection by passing another wire or a cord, hook or other means through the loop below the spring coils. The spring coils are thus securely connected together and held against relative movement in a lateral direction without affecting their free flexing. The connecting wire may be made up from short lengths of wire having a curled loop at one or both ends. Where a curled loop is formed at one end only, the other end may be arranged to form the locking means for locking the spring coils into the curled loop on the next length of connecting wire.

Some practical forms of my invention are illustrated by way of example in the accompanying drawings in which:—

Figure 1 is a plan view showing one form of connecting member for connecting the end coils of adjacent pocketed springs in a spring assembly for a mattress or the like.

Figure 1:
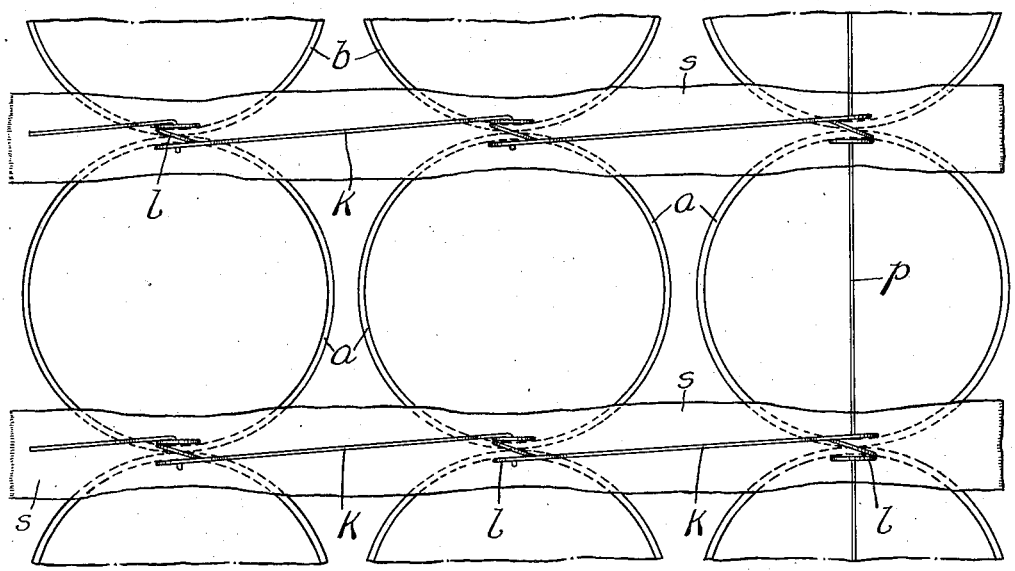
Figure 2:
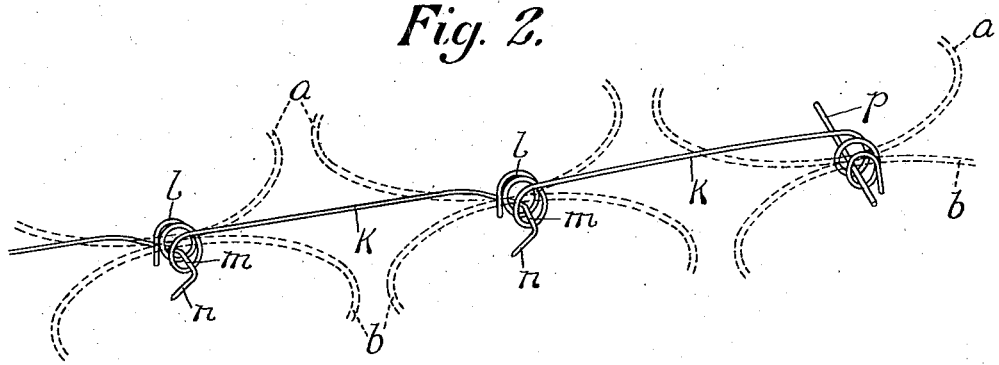
Figure 2 is a perspective view of the construction shown in Figure 1 omitting the tape.
Figure 3:
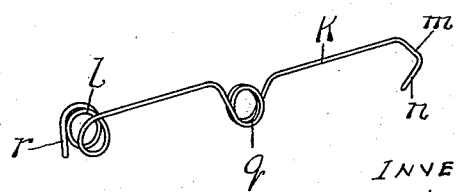
Figure 3 is a perspective view of a modification of one of the connecting members used in Figures 1 and 2.

In the arrangement shown in Figures 1, 2 and 3 the connecting wires are formed of short lengths of wire, each of which has a curled loop at one end and a locking part at the other end. As shown each length of wire $k$ is formed with a curled loop $l$ at one end and at the other end has a part $m$ cranked at right angles to the line of the wire and a pointed terminal part $n$ cranked at an acute angle to the part $m$. The loop $l$ of one length of wire $k$ is fitted over the spring coils and the parts $mn$ of the next length of wire $k$ are inserted through the loop below the spring coils and so on. The first length of wire $k$ at one edge of the assembly is formed with a curled loop $l$ at each end and the connections of the end loops to the first row of springs at the edge of the assembly are locked by a wire or cord $p$ extending at right angles to the wires $k$.

If desired a coil $q$ of one or more turns may be formed in the wire $k$ at or about the middle of its length as shown in Figure 3 to give additional resilience to the connecting wire at a point between the springs, and similar coils may be formed in any of the other connecting wires described herein.

The coil $q$ is preferably stepped down below the line of the wire $k$ as shown in Figure 3 so that it does not project above the surface formed by the upper ends of the upholstery springs.

The free end of the loop $l$ is preferably carried out at a tangent from the loop as shown at $r$ so that it extends below the next connecting wire when the parts are assembled and there is no risk of the next wire riding over the end of the loop and causing a noise when the assembly flexes.

Figure 4:
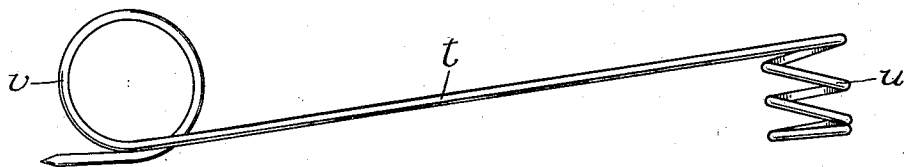
Figure 4 is a plan view of a modified form of connecting member.
Figure 5:
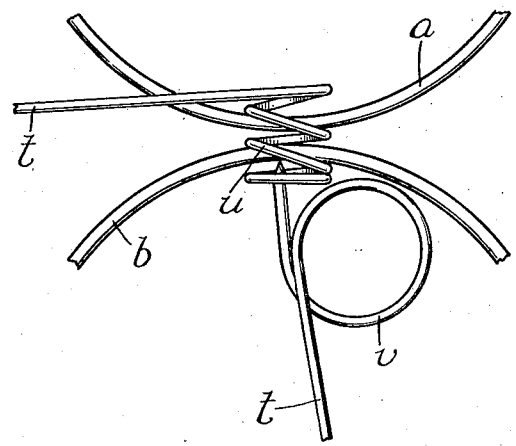
Figure 5 is a plan showing the connecting member of Figure 4 fitted over the adjacent parts of two springs and a second connecting member being inserted to lock the connection.
Figure 6:
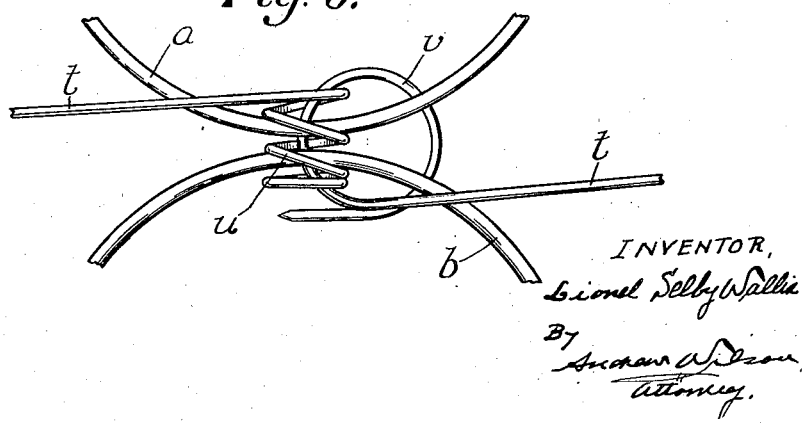
Figure 6 is a similar view showing the parts in their final locked position.

In the further form of connecting wire shown in Figures 4, 5 and 6 one end of the wire $t$ is formed with a curled loop or coil $u$ of at least two turns which are spaced axially so that when the coil is placed over the adjacent parts of two upholstery springs as shown in Figure 5 each spring is received in a separate turn of the coil and the springs are held out of contact with each other.

The other end of the wire is formed with a single turn coil $v$ of larger diameter and having its axis at right angles to the axis of the coil $u$. After the coil $u$ of one wire has been fitted over the upholstery springs the free end of the coil $v$ on the next wire is inserted through the coil $u$ below the upholstery springs as shown in Figure 5 and the second wire is then swung round by the operator to thread the coil $v$ through the coil $u$ until the second wire comes substantially into alignment with the first as shown in Figure 6. The first wire $t$ will have a coil $u$ at each end and the transverse row of coils $u$ connecting the row of springs at that edge of the assembly will be locked by a transverse wire or cord.

Where the springs are pocketed or a tape is employed the free end of the coil $u$ on the connecting wire is preferably pointed to facilitate its insertion through the fabric of the pockets.

It will be seen from Figure 6 that the free end of the coil $v$ lies well below the end coils of the springs $ab$ so that there is no risk of it damaging or projecting through a cover for the spring assembly.

I claim:

1. A spring assembly comprising upholstery springs arranged in parallel rows, connecting wires of a length substantially equal to the spacing between adjacent springs of a row, a curled loop on one end of each connecting wire fitting over the adjacent parts of the end coils of two springs in adjacent rows, and a cranked end on the other end of said wire inserted through a curled loop on the next connecting wire below the spring coils fitting therein.

2. A spring assembly comprising upholstery springs arranged in parallel rows, series of connecting wires each series extending adjacent to the end coils of adjacent rows of springs, an integral loop on each connecting wire in the form of a helix and depending wholly below the longitudinal line of the wire and having its axis at right angles to the line of the wire, said loops severally engaging over the adjacent parts of the end coils of two springs set in adjacent rows, and means consisting of free ends of the connecting wires each inserted in the loop of the next succeeding connecting wire in the series and locking the spring coils in said loops.

3. A spring assembly comprising upholstery springs arranged in parallel rows, series of connecting wires each series extending adjacent to the end coils of adjacent rows of springs, an integral resilient loop on each connecting wire in the form of a helix of a plurality of turns and depending wholly below the longitudinal line of the wire and having its axis at right angles to the line of the wire, said loops severally engaging over the adjacent parts of the end coils of two springs set in adjacent rows, each connecting wire having integral means inserted in the loop of the next independent, succeeding connecting wire in the series and locking the spring coils in said loops.

4. A spring assembly comprising upholstery springs arranged in parallel rows, series of connecting wires each series extending adjacent to the end coils of adjacent rows of springs, an integral loop on each connecting wire in the form of a helix and depending wholly below the longitudinal line of the wire and having its axis at right angles to the line of the wire, said loops severally engaging over the adjacent parts of the end coils of two springs set in adjacent rows, and means consisting of free ends of the connecting wires each formed into an integral helical loop, disposed at right angles to the loop at the other end of the connecting wire, inserted in the loop of the next succeeding independent connecting wire in the series and locking the spring coils in said loops.

5. A spring assembly comprising upholstery springs arranged in parallel rows, series of connecting wires each series extending adjacent to the end coils of adjacent rows of springs, an integral loop on each connecting wire in the form of a helix of at least two turns and depending wholly below the longitudinal line of the wire and having its axis at right angles to the line of the wire, said loops severally engaging over the adjacent parts of the end coils of two springs set in adjacent rows the end coil of each spring being in a separate turn of the loop, and means consisting of free ends of the connecting wires each inserted in the loop of the next succeeding independent connecting wire in the series and locking the spring coils in said loops.

6. A spring assembly comprising upholstery springs arranged in parallel rows, series of connecting wires each series extending adjacent to the end coils of adjacent rows of springs, an integral loop on each connecting wire in the form of a helix and depending wholly below the longitudinal line of the wire and having its axis at right angles to the line of the wire, said loops severally engaging over the adjacent parts of the end coils of two springs set in adjacent rows, said wires each having an integral spring coil therein intermediate of its ends, and means consisting of free ends of the connecting wires each inserted in the loop of the next succeeding independent connecting wire in the series and locking the spring coils in said loops.

LIONEL SELBY WALLIS.